(12) United States Patent
Marcks

(10) Patent No.: US 8,047,358 B1
(45) Date of Patent: Nov. 1, 2011

(54) COVER FOR A CONVEYOR

(75) Inventor: Randal L. Marcks, St. Ansgar, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 0 days.

(21) Appl. No.: 12/842,721

(22) Filed: Jul. 23, 2010

(51) Int. Cl.
*B65G 21/08* (2006.01)
(52) U.S. Cl. ................................. 198/860.5; 198/735.5
(58) Field of Classification Search ............... 198/860.3, 198/860.5, 735.3, 735.5
See application file for complete search history.

(56) References Cited

U.S. PATENT DOCUMENTS

| | | | | |
|---|---|---|---|---|
| 2,038,471 | A * | 4/1936 | Benatar ................... | 198/860.5 |
| 3,856,135 | A * | 12/1974 | Hayakawa et al. ........ | 198/860.5 |
| 3,878,936 | A * | 4/1975 | Niggemyer ................ | 198/860.5 |
| 4,090,604 | A * | 5/1978 | Reifert ..................... | 198/860.5 |
| 4,241,823 | A * | 12/1980 | Clewett .................... | 198/735.5 |
| 4,798,283 | A * | 1/1989 | Booth et al. .............. | 198/860.5 |
| 4,846,580 | A * | 7/1989 | Oury ......................... | 198/860.5 |
| 5,682,977 | A * | 11/1997 | White ....................... | 198/860.5 |
| 6,626,285 | B2 * | 9/2003 | Enomoto ................... | 198/860.5 |

OTHER PUBLICATIONS

Lambton Conveyor Limited, Level Drag Conveyor Owners Manual, pp. 6-11, Lambton One Source One Solution, Revision Nov. 1/07, Florence, ON, N0P 1R0.

Brock Grain Systems, Brock Enclosed Roller-Belt Conveyors brochure, BR-2076/0108.
IS Intersystems, Kleen-Drag the Self-Cleaning En-Masse Conveyor brochure, IS iS0 9001 Certified, Omaha, Nebraska.
Chief AGRI/Industrial Division of Chief Industries, Inc., Bucket Elevators and Conveyors Commercial Series Material Handling brochure, IB2.5M7/09, Kearney, Nebraska.
GSI Total Value, Total Systems, Bucket Elevators & Conveyors brochure, GS-019 Nov. 2008, Assumption, IL.
York Horizontal Dragonveyors, Grain Handling brochure, MFS/YORK/STORMOR A Division of Global Industries, Inc., 1999 Global Industries, Inc. Grand Island, Nebraska.
Sudenga Industries, Inc., Drag Chain Conveyors brochure, Dec. 2009, George, Iowa.
Union Iron a Division of AG Growth Industries, We Offer Solutions "En-Masse" Chain Conveyor brochure, Decatur, Illinois.
MFS/YORK/STORMOR A Division of Global Industries, Inc., Drag Conveyor Construction and Owner's Manual brochure, pp. 20, 33 and 37, Rev. 10-08 [1].
Schlagel Manufacturers of Innovative Materials Handling Equipment Since 1957, Powerflow Conveyor Installation and Operation Manual, pp. 7 and 15, Cambridge, Minneapolis.

* cited by examiner

*Primary Examiner* — James R Bidwell

(57) ABSTRACT

A cover having at least two elongated members with each member having a hook at one end and a prong at the opposite end. The hook receives the prong of an adjacent member to interlock adjacent members. The members also have downwardly extending flanges that fit over flanges on a conveyor. The cover is connected to the conveyor by one or more brackets.

3 Claims, 2 Drawing Sheets

COVER FOR A CONVEYOR

BACKGROUND OF THE INVENTION

This invention is directed to a cover for a conveyor and more particularly to a cover for a drag conveyor.

Covers for conveyors are known in the art. Typically, a cover consists of two elongated members that overlap wherein a sealant is applied to prevent moisture from leaking into the conveyor. Alternatively, the elongated members abut one another and a splice plate is placed over the seam and then bolted to the conveyor. Another cover includes flanges on the ends of the elongated member that are received in a cap that is bolted to or frictionally fit to the flanges.

While helpful, these covers are still deficient in that they require sealant, tools to assemble and remove, many separate parts, and they tend to sag due to the weight of the cover. Therefore, a need exists in the art for a cover that addresses these deficiencies.

Therefore an objective of the present invention is to provide a cover that does not require sealant.

A further objective of the present invention is to provide a cover that reduces the need for tools to assemble and remove.

A still further objective is to provide a cover that has fewer parts.

Another objective of the present invention is to provide a cover that prevents sag.

These and other objectives will be apparent to one of ordinary skill in the art based upon the following written description.

SUMMARY OF THE INVENTION

A cover having at least two elongated members with each member having a hook at one end and a prong at the opposite end. The hook receives the prong of an adjacent member to interlock adjacent members. The members also have downwardly extending flanges that fit over flanges on a conveyor. The cover is connected to the conveyor by one or more brackets.

DETAILED DESCRIPTION OF THE PREFERRED EMBODIMENTS

Figure 1:
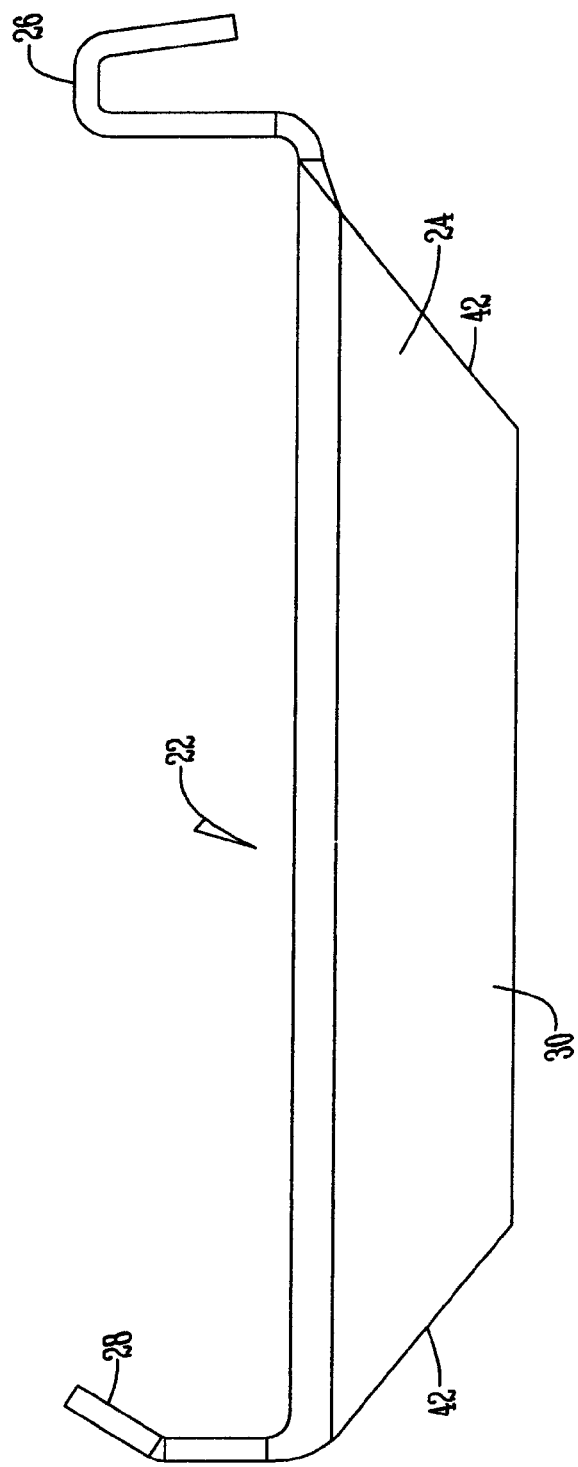
FIG. 1 is a side view of an elongated member.
Figure 2:
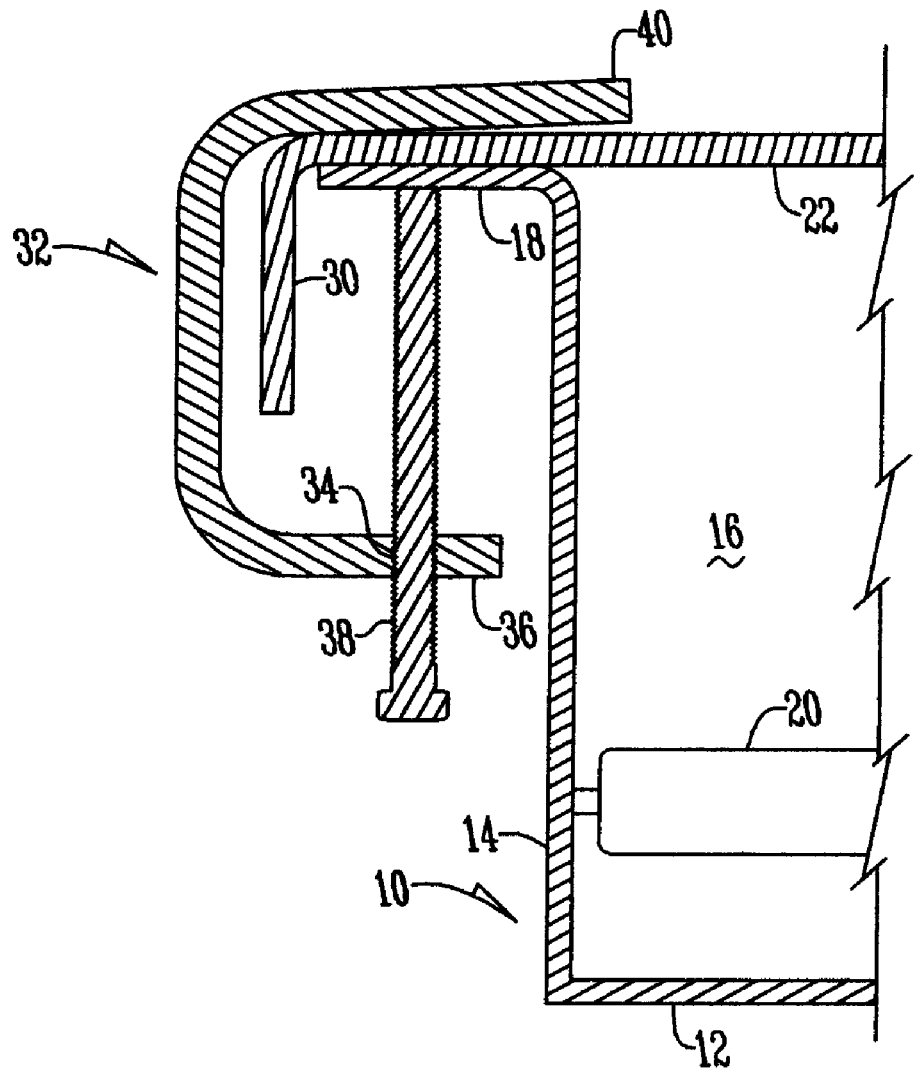
FIG. 2 is a sectional view of a cover.

Referring to the Figures, a conveyor 10 generally has a bottom wall 12 and sidewalls 14 that form a chamber 16. The sidewalls 14 typically are comprised of multiple pieces connected together and having outwardly extending flanges 18 on the top and ends. Disposed within the chamber 16 are a plurality of rollers 20 that extend between the sidewalls 14. The conveyor 10 is conventional and not considered part of the present invention.

A cover 22 has at least two elongated members 24 that extend along the length of and over the top of flanges 18 of conveyor 10. Each elongated member 24 has a hook 26 at one end and a prong 28 at the opposite end. The hook 26 is formed to receive the prong 28 of an adjacent member 24 so that adjacent members 24 interlock. The interlocking ends prevent sag. The elongated members 24 also have downwardly extending flanges 30 on each side that fit over flanges 18 of the conveyor 10.

At least one, and preferably more, brackets 32 are used to secure the cover 22 to the conveyor 10. While the bracket 32 is of any size, shape, and structure, preferably the bracket 32 is C-shaped having an opening 34 in a lower section 36 that receives a bolt 38. In this embodiment the bracket is positioned such that an upper section 40 fits over the cover 22 and the lower section 36 is positioned below the outwardly extending flange 18 of the sidewall of the conveyor 10. The bolt 38 is inserted through the opening 34 and is threadably received by a hole of the lower section 36. The bolt 38 is threaded through the hole 34 until the end of the bolt 38 engages the outwardly extending flange 18 to secure the cover 22 to the adjacent cover 22 and conveyor 10.

In one embodiment, an angular section 42 forms a cutaway from flange 30 to facilitate bending and over hang of the cover 22. Therefore, a cover for a conveyor has been disclosed that at the very least meets all the stated objectives.

What is claimed is:

1. A cover for a conveyor, comprising:
   at least two elongated members having a hook on one end and a prong on an opposite end wherein the hook of one member receives the prong of an adjacent second member to interlock the two elongated members; and
   at least one bracket to secure the one member to the adjacent second member.

2. The cover of claim 1 wherein the elongated members have downwardly extending flanges on the member's sides.

3. The cover of claim 1 wherein the bracket is C-shaped having an upper section and a lower section, the lower section having an opening that receives a bolt.

* * * * *